UNITED STATES PATENT OFFICE.

HERMANN GUTZKOW, OF FRANKFORT-ON-THE-MAIN, GERMANY, ASSIGNOR TO THE FARBWERKE, VORMALS MEISTER, LUCIUS & BRÜNING, OF HÖCHST-ON-THE-MAIN, GERMANY.

GREEN-BLUE SOLUBLE DYE AND PROCESS OF MAKING SAME.

SPECIFICATION forming part of Letters Patent No. 613,920, dated November 8, 1898.

Application filed December 15, 1897. Serial No. 662,004. (Specimens.)

*To all whom it may concern:*

Be it known that I, HERMANN GUTZKOW, chemist, a citizen of the Empire of Germany, residing at Frankfort-on-the-Main, Germany, have invented certain new and useful Improvements in the Manufacture of Greenish-Blue Basic Dyestuffs, of which the following is a description.

This invention relates to the production of greenish-blue basic dyestuffs.

Beyer and Keozel (*Moniteur Scientif.*, 1886, pp. 984-5) obtained dyestuffs by the action of diazo compounds of phenosafranin or its homologues upon alpha or beta naphthylamin—namely, with alpha-naphthylamin a reddish-blue dyestuff, soluble in water, and with beta-naphthylamin a blue dyestuff, insoluble in water. These dyestuffs had no special tinctorial properties and were, consequently, not used in the dye industry.

I have found that by the action of diazo compounds of the asymmetric dialkylphenosafranin of the general formula

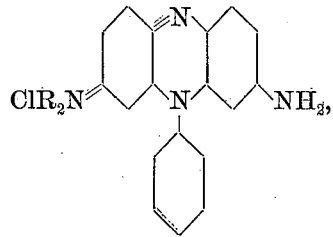

(where "R" represents $CH_3$, $C_2H_5$, &c.) greenish-blue dyestuffs, soluble in water, may be obtained.

I proceed, for instance, as follows: eight kilos of asymmetric diethylsafranin (obtained by oxidizing a mixture of one molecule of paraämidodiethylanilin plus two molecules anilin) are dissolved in eight hundred liters of water, to which are added eight kilos hydrochloric acid (thirty-three per cent.) and a solution of 1.4 kilos of sodium nitrite. Into the blue diazo solution thus resulting is run a solution of 2.8 kilos alpha-naphthylamin or beta-naphthylamin in 2.3 kilos of hydrochloric acid (or the equivalent quantity of another acid) and the requisite quantity of water. After some hours the dyestuff obtained is precipitated with common salt, filtered, pressed, and dried.

Instead of the above-mentioned diethylphenosafranin, the equivalent quantity of asymmetric dimethylphenosafranin or the equivalent quantities of homologues of the said asymmetric dialkylphenosafranins may be employed, in particular the following: asymmetric dimethyl-tolusafranin from one molecule paraämidodimethylanilin, two molecules orthotoluidin; asymmetric diethylphenotolusafranin from one molecule paraämidodiethylanilin plus two molecules orthotoluidin, or one molecule paraämidodimethylanilin plus one molecule anilin plus one molecule paratoluidin, or one molecule paraämidodimethylanilin plus one molecule orthotoluidin plus one molecule paratoluidin; asymmetric diethylphenotolusafranin from one molecule paraämidodiethylanilin plus one molecule anilin plus one molecule orthotoluidin, or one molecule paraämidodiethylanilin plus one molecule anilin plus one molecule paratoluidin, or one molecule paraämidodiethylanilin plus one molecule orthotoluidin plus one molecule paratoluidin, or mixtures of the same.

The dyestuffs thus obtained are darkish-violet powders of metallic luster, soluble in water, alcohol, and acetone, with a blue color, insoluble in ether and benzene, soluble in concentrated sulfuric acid with a green color.

The new dyestuffs dye the animal and vegetable fiber greenish blue.

Having now described my invention, what I claim is—

1. The above-described process for the manufacture of greenish-blue dyestuffs soluble in water, consisting in causing the diazo compounds of asymmetric dialkylsafranin to act upon naphthylamin, substantially as set forth.

2. The new product derived from the diazo compounds of asymmetric diethylsafranin and naphthylamin, being a darkish-violet powder of metallic luster, soluble in water, alcohol and acetone with a blue color, insoluble in ether and benzene, and soluble in concentrated sulfuric acid with a green color, substantially as set forth.

In testimony that I claim the foregoing as my invention I have signed my name in presence of two subscribing witnesses.

HERMANN GUTZKOW.

Witnesses:
HEINRICH HAHN,
ALFRED BRISBON.